United States Patent
Lee et al.

(10) Patent No.: US 11,281,272 B2
(45) Date of Patent: Mar. 22, 2022

(54) REDUCING STANDBY POWER IN A SWITCH MODE POWER SUPPLY

(71) Applicant: Diodes Incorporated, Plano, TX (US)

(72) Inventors: Ko-Yen Lee, New Taipei (TW); Adrian Wang, San Jose, CA (US); Clive Huang, Taoyuan (TW)

(73) Assignee: DIODES INCORPORATED, Plano, TX (US)

( * ) Notice: Subject to any disclaimer, the term of this patent is extended or adjusted under 35 U.S.C. 154(b) by 31 days.

(21) Appl. No.: 16/809,467

(22) Filed: Mar. 4, 2020

(65) Prior Publication Data
US 2020/0287454 A1 Sep. 10, 2020

Related U.S. Application Data

(60) Provisional application No. 62/816,062, filed on Mar. 9, 2019.

(51) Int. Cl.
*G06F 1/26* (2006.01)
*H02M 1/08* (2006.01)
(Continued)

(52) U.S. Cl.
CPC .......... *G06F 1/266* (2013.01); *G06F 13/4282* (2013.01); *H02M 1/0032* (2021.05);
(Continued)

(58) Field of Classification Search
CPC ........ H02M 1/08; H02M 1/36; H02M 1/0032; H02M 1/0035; H02M 3/33523; H02M 3/156; H02M 1/0006; H02M 1/0048; H02M 3/33576; H02M 7/217; H02M 3/33507; G06F 1/266; G06F 1/28; G06F 1/3206;
(Continued)

(56) References Cited

U.S. PATENT DOCUMENTS 9,912,243 B2 3/2018 Quigley
10,693,384 B1 * 6/2020 Mondal ............. H02M 3/33592
(Continued)

OTHER PUBLICATIONS

Rogers, Andrew. "Introduction to USB Type-C™". Application Note AN1953. Microchip Technology Inc. 2015. (Year: 2015).*
(Continued)

*Primary Examiner* — Thomas J. Cleary
(74) *Attorney, Agent, or Firm* — Kilpatrick Townsend & Stockton LLP

(57) ABSTRACT

In a power supply having a control circuit for regulating the power supply output and a load switch for connecting the output to a load device, a method for reducing standby power includes determining if a load device is connected to the power supply. If no load device is connected, the load switch is turned off, and the power supply enters a standby mode, which includes alternating first time period of power-saving mode and second time period of regulating mode. In the power-saving mode, the control circuit stops regulating the output of the power supply and turns off one or more functional blocks to allow the output to drop, until the output reaches a pre-set low output limit. In the regulating mode, the control circuit turns on the functional blocks and regulates the power supply to allow the output to increase, until the output reaches a pre-set high output limit.

8 Claims, 8 Drawing Sheets

(51) Int. Cl.
*H02M 3/335* (2006.01)
*G06F 13/42* (2006.01)
*H02M 3/156* (2006.01)
*H02M 1/00* (2006.01)
*H02M 1/36* (2007.01)

(52) U.S. Cl.
CPC .............. *H02M 1/08* (2013.01); *H02M 1/36* (2013.01); *H02M 3/156* (2013.01); *H02M 3/33523* (2013.01); *G06F 2213/0042* (2013.01); *H02M 1/0035* (2021.05); *Y02B 70/10* (2013.01)

(58) Field of Classification Search
CPC .. G06F 1/32156; G06F 1/3215; G06F 1/3287; G06F 13/4282; G06F 2213/0042; G06F 13/4022; Y02B 70/10; Y02D 10/00
See application file for complete search history.

(56) References Cited

U.S. PATENT DOCUMENTS

| | | | |
|---|---|---|---|
| 10,910,954 B1* | 2/2021 | Shah | H02M 1/36 |
| 2010/0202161 A1* | 8/2010 | Sims | H02M 7/02 363/20 |
| 2014/0016359 A1* | 1/2014 | Telefus | H02M 3/335 363/16 |
| 2014/0159696 A1* | 6/2014 | Han | H02M 3/33576 323/311 |
| 2016/0181934 A1* | 6/2016 | Kikuchi | H02M 3/33523 363/21.14 |
| 2017/0207694 A1* | 7/2017 | Strijker | H02M 1/08 |
| 2017/0358994 A1* | 12/2017 | Ueno | H02M 3/33561 |
| 2017/0366092 A1* | 12/2017 | Langeslag | H02M 3/33523 |
| 2018/0375437 A1* | 12/2018 | Liu | H02M 3/33523 |

OTHER PUBLICATIONS

Richardson, Christopher. "Safe, Reliable Designs for Non-Isolated Offline Switchers with 400VDC Rated Power Inductors". Application Note ANP021. Würth Elektronik eiSos GmbH & Co. KG. Feb. 18, 2014. (Year: 2014).*

"PWM Controller for Programmable Power Converter (USBPD)". RT7786. Richtek Technology Corporation. Feb. 2015. (Year: 2015).*

AP43771, High-Performance USB PD Controller, Document No. DS41431 Rev. 5-2, © Diodes Incorporated, Oct. 2019, 10 pages.

* cited by examiner

REDUCING STANDBY POWER IN A SWITCH MODE POWER SUPPLY

CROSS-REFERENCES TO RELATED APPLICATIONS

This application claims priority to U.S. Provisional Patent Application No. 62/816,062, filed Mar. 9, 2019, entitled "CIRCUIT AND METHOD FOR REDUCING STANDBY POWER," commonly assigned, incorporated by reference in its entirety herein for all purposes.

BACKGROUND OF THE INVENTION

The present invention relates to switching mode power supplies. More particularly, the invention provides methods and apparatus for reducing power consumption of switching mode power supplies.

Regulated power supplies are indispensable in modern electronics. For example, the power supply in a personal computer often needs to receive power input from various outlets. Desktop and laptop computers often have regulated power supplies on the motherboard to supply power to the CPU, memories, and periphery circuitry. Mobile devices need chargers that provide regulated charging powers. A switching mode controller rapidly switches a power transistor on and off with a variable duty cycle or variable frequency and provides an average output that is the desired output voltage or output current.

Universal Serial Bus (USB) is an industry standard that establishes specifications for cables and connectors and protocols for connection, communication and power supply between computers, peripheral devices, and other computers. USB Implementers Forum (USB IF) published USB Power Delivery (PD) function and type C connector for universal 3C products in 2014. The USB PD and Type C are directed to connecting all devices in one connector. A Power Delivery (PD) controller is a secondary-side controller for handling USB Type-C connectors. USB-C connectors and cables can connect to both hosts and devices, replacing various electrical connectors including USB-B and USB-A, HDMI, DisplayPort, and 3.5 mm audio cables and connectors. USB PD controllers include many circuit blocks for handling complex functions. For example, in order to change voltage and communication to fulfill PD functions, the system need additional components, such as a PD decoder. As a result, the system consumes more power.

Therefore, a more power efficient secondary-side controller for a SMPS that supports USB PD functions is highly desirable.

BRIEF SUMMARY OF THE INVENTION

The inventors have recognized that, USB PD controllers need to support complex functions and consume more power than previous controllers. The USB-C connector is connected to the output of the converter via a load switch. When the USB-C controller detects that no load device connected to the converter, the controller turns off the load switch to disconnect the power provided to the USB-C connector and the load device. In the conventional USB PD products, even when no load device is connected, the power supply maintains a constant output voltage Vout, and the USB PD integrated circuit (PDIC) remains active and consumes power.

This invention teaches a USB PD controller that continuously monitors the status of the USB interface to determine if a load device is connected. If no load device is connected, besides turning off the load switch to disconnect the power supply output from the USB connector. The USB PD controller also forces a feedback voltage (VFB) to a pre-set low value to cause the primary-side controller to stop regulating the output voltage. Under this condition, the power supply output voltage Vout is sustained by the capacitance of the system, which provides operating power to the active circuit blocks. To further reduce power consumption in the standby state, the USB PD controller turns off the power supply to all functional blocks in the USB PD controller except for the circuitry to continue to monitor the status of the load device and the circuitry to monitor the output voltage of the converter. As the capacitance of the system discharges, the power supply output voltage Vout starts to drop. Once the power supply output voltage Vout drops to a pre-set low voltage limit $V_L$, the USB PD controller raises the VFB signal to start to regulate, which causes the converter output voltage Vout to rise. When Vout reaches a pre-set high voltage limit $V_H$, and no USB device is connected, the USB PD controller causes the primary-side controller to stop regulating. This cycle is repeated, until USB PD controller senses that a USB device is connected, the USB PD controller wakes up the primary-side controller to resume normal regulating function, restores power to all its functional blocks, and turns on the load switch to connect the power supply output to the USB connector.

For example, the invention teaches a method for reducing standby power in a power supply, which has a control circuit for regulating an output of the power supply and a load switch for connecting the output of the power supply to a load device. The method includes determining if a load device is connected to the power supply. In response to determining that no load device is connected to the power supply, the load switch is turned off to disconnect from the load device, and the power supply enters a standby mode. The standby mode includes alternating first time period of power-saving mode and second time period of regulating mode. In the power-saving mode, the control circuit stops regulating the output of the power supply and turns off one or more functional blocks to allow the output to drop, until the output reaches to a pre-set low output limit. In the regulating mode, the control circuit turns on the functional blocks and regulates the power supply to allow the output to increase, until the output reaches a pre-set high output limit, at which point, the power supply enters the power-saving mode. In response to determining that a load device is connected to the power supply, the power supply enters a normal mode, in which the control circuit regulates the output of the power supply, the functional blocks in the control circuit are powered on, and the load switch is turned on to connect the load device to the power supply.

The invention also teaches a Universal Serial Bus Power Delivery (USB PD) controller that includes a first terminal for coupling to a secondary winding of a switch mode power supply (SMPS) for receiving operating power, a second terminal providing a control signal to a load switch coupled between the secondary winding and an USB connector, and a third terminal for providing a feedback signal to a primary-side controller of the SMPS. The USB PD controller also includes a decoder for monitoring CC1 and CC2 signals from the USB connector to determine if a USB device is connected. Further, the USB PD controller also has a control logic configured to monitor CC1 and CC2 signals from the USB connector to determine if a USB load device is connected. Upon determining that no USB load device is connected to the USB connector, the controller turns off the load switch to disconnect the secondary winding from the USB connector and enters a standby mode. The standby mode includes alternating first time period of power-saving mode and second time period of regulating mode, In the power-saving mode, the control logic stops regulating the output of the power supply and turns off one or more functional blocks to allow the output to drop, until the output reaches to a pre-set low output limit. In the regulating mode, the control logic turns on the functional blocks and regulates the power supply to allow the output to increase, until the output reaches a pre-set high output limit. Upon determining that a USB load device is connected to the USB connector, the power supply enters a normal mode, in which the control logic regulates the output of the power supply, the functional blocks are powered on, and the load switch is turned on to connect the load device to the power supply.

The invention also teaches a switch mode power supply (SMPS) with a Universal Serial Bus Power Delivery (USB PD) controller. The SMPS includes a transformer having a primary winding for coupling to an external input voltage and a secondary winding for providing an output voltage of the SMPS, a load switch coupling the secondary winding to a USB connector, and a power switch for coupling to the primary winding of the SMPS. The SMPS also has a primary-side controller coupled to the power switch to control the power switch, the primary-side controller including a feedback terminal for receiving a feedback signal representative of the output voltage of the SMPS through an opto-coupler. The primary-side controller is configured for generating a control signal for turning on and off the power switch based at least on the feedback signal to regulate the output voltage of the SMPS at a target voltage. The primary-side controller can operate in a pulse-width modulation (PWM) mode during normal operation, and the primary-side controller operates in a burst mode during low-load or no-load conditions. The SMPS also has a USB PD controller coupled to the secondary winding for providing support for USB Power Delivery operations, wherein the USB PD controller configured to monitor CC1 and CC2 signals from the USB connector. In an active mode, upon determining that no USB load device is connected to the USB connector, the USB PD controller causes the SMPS to enter a standby mode.

In the above SMPS, in the standby mode, upon determining that a USB load device is connected to the USB connector, the USB PD controller causes the SMPS to enter an active mode. To cause the SMPS to enter the standby mode, the USB PD controller is configured to turn off the load switch to disconnect the output voltage of the SMPS from the USB connector, turn off one or more functional blocks in the USB PD controller, and monitor the output voltage of the SMPS. Upon determining that the output voltage is above a high standby voltage limit, which can be a pre-set high voltage limit, the USB PD controller sets the feedback signal at a first value to the primary-side controller, through the opto-coupler, to cause the primary-side controller to stop regulating the output voltage, and allow the output voltage to drop. Upon determining that the output voltage is below a low standby voltage limit, which can be a pre-set low voltage limit, the USB PD controller sets the feedback signal at a second value to the primary-side controller, through the opto-coupler, to cause the primary-side controller to start regulating the output voltage, and allow the output voltage to rise. To cause the SMPS to enter the active mode, the USB PD controller is configured to turn on the one or more functional blocks in the USB PD controller, set the feedback signal at the second value to the primary-side controller, through the opto-coupler, to cause the primary-side controller to start regulating the output voltage in the active mode, and turn on the load switch to connect the output voltage of the SMPS to the USB connector.

Definitions

The terms used in this disclosure generally have their ordinary meanings in the art within the context of the invention. Certain terms are discussed below to provide additional guidance to the practitioners regarding the description of the invention. It will be appreciated that the same thing may be said in more than one way. Consequently, alternative language and synonyms may be used.

A power switch, as used herein, refers to a semiconductor switch, for example, a transistor, that is designed to handle high power levels.

A power MOSFET is a specific type of metal oxide semiconductor field-effect transistor (MOSFET) designed to handle significant power levels. An example of a power MOSFET for switching operations is called a double-diffused MOS or simply DMOS.

A power converter is an electrical or electro-mechanical device for converting electrical energy, such as converting between AC and DC or changing the voltage, current, or frequency, or some combinations of these conversions. A power converter often includes voltage regulation.

A regulator or voltage regulator is a device for automatically maintaining a constant voltage level.

A switching regulator, or switch mode power supply (SMPS) is a power converter that uses an active device that switches on and off to maintain an average value of output. In contrast, a linear regulator is made to act like a variable resistor, continuously adjusting a voltage divider network to maintain a constant output voltage, and continually dissipating power.

A voltage reference is an electronic device that ideally produces a fixed (constant) voltage irrespective of the loading on the device, power supply variations, temperature changes, and the passage of time.

A reference voltage is a voltage value that is used as a target for a comparison operation.

When the term "the same" is used to describe two quantities, it means that the values of two quantities are determined the same within measurement limitations.

DESCRIPTION OF THE INVENTION

Figure 1:
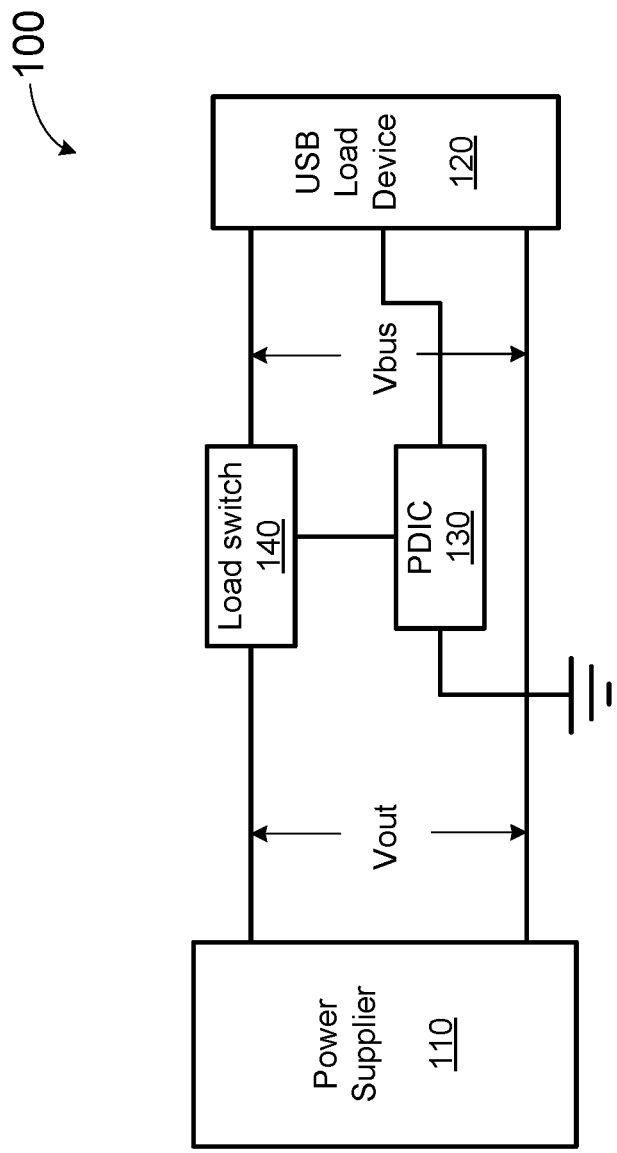
FIG. 1 is a simplified block diagram illustrating a system with a power supply providing power to a USB device that embodies certain aspects of this invention.

FIG. 1 is a simplified block diagram illustrating a system with a power supply providing power to a USB PD device that embodies certain aspects of this invention. As shown in FIG. 1, system 100 includes a power supply 110, which can be a switch mode power supply (SMPS), providing electric power to a USB load device 120. The load device 120 can be any electronic device having a compatible USB connector, such as a personal computer, a laptop computer, a mobile device, or a charger.

As described below in connection with FIG. 5, in a flyback converter, such as a switch mode power supply (SMPS) 110, the primary-side controller (e.g., a PWM controller) regulates the current in the transformer through a power switch to provide a constant output voltage (or current), in response to a feedback voltage (VFB), which represents the converter output voltage. The feedback voltage is sampled on the output side of the transformer and coupled back to the primary-side controller through an interface device, such as an opto-coupler.

In FIG. 1, a USB PD controller integrated circuit (PDIC) 130 is coupled to the secondary-side of the transformer to perform various control functions related to USB PD. PDIC 130 is coupled to a load switch 140, which connects power supply 110 to USB load device 120. The output voltage of power supply 110 is Vout, and the voltage provided to USB load device 120 is Vbus. The USB PD controller 130 continuously monitors the status of the USB interface to manage power consumption in the system, as described below with reference to the flowchart in FIG. 2, and the diagrams in FIGS. 3 and 4.

Figure 2:
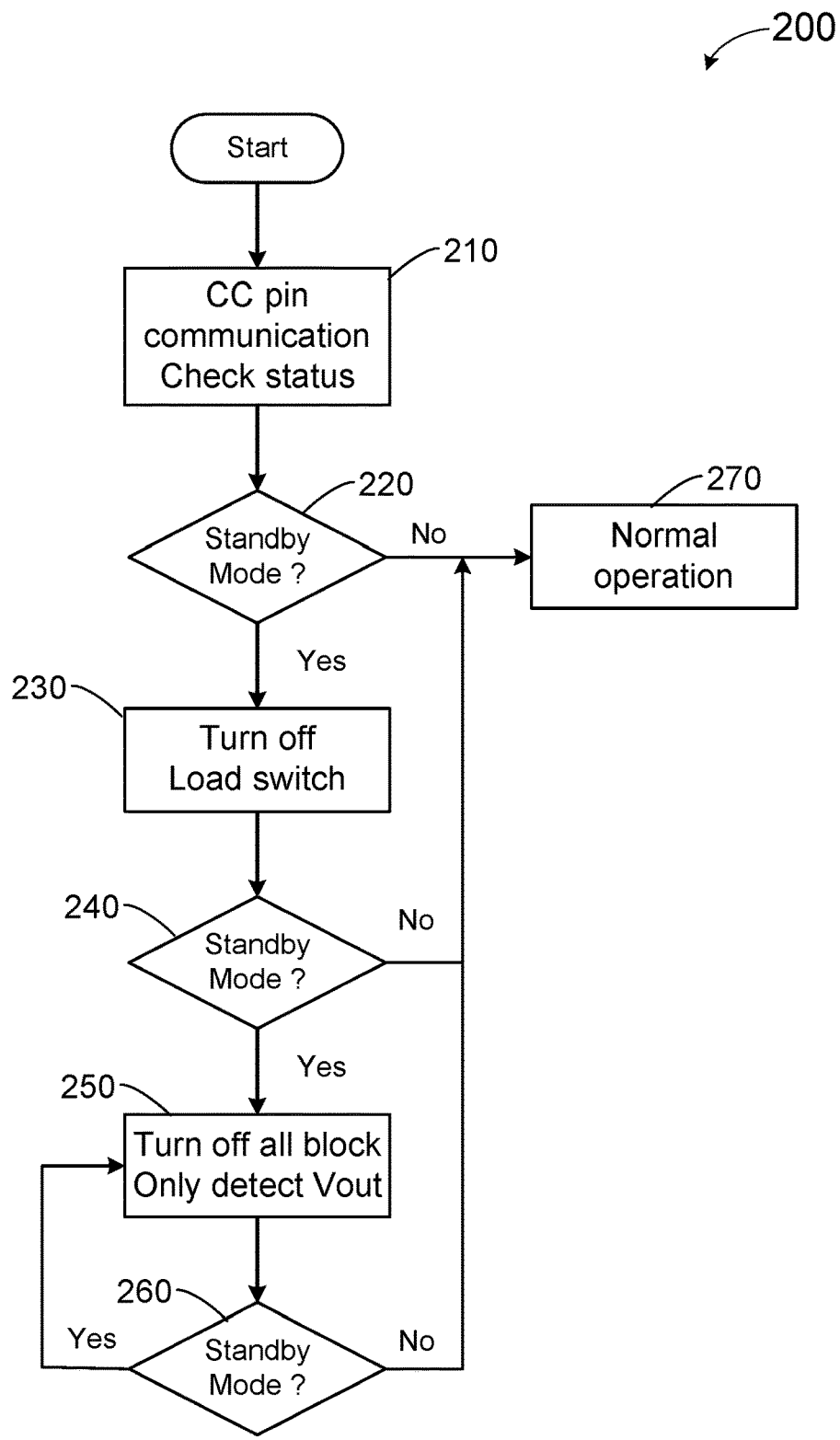
FIG. 2 is a simplified flowchart illustrating a method for reducing standby power using a USB Power Delivery (USB PD) Controller that embodies certain aspects of this invention.

FIG. 2 is a simplified flowchart illustrating a method 200 for reducing standby power using a USB Power Delivery (USB PD) Controller that embodies certain aspects of this invention. As shown in the flowchart, at 210, the USB PD controller monitors the status signal from CC pins of a USB interface, such as a USB connector. At 220, the USB PD controller determines if the power supply should be in a standby mode. If so, the method proceeds to 230. Otherwise, the method goes to normal operation mode 270. As an example, the power supply can be put in the standby mode if no USB device is connected to the power supply. On the other hand, if a USB device is connected, the power supply is in a normal operation mode.

At 230, when the USB PD controller decides that the power supply should be in the standby mode, it turns off the load switch 140. At 240, the USB PD controller continues to check the standby condition. If the standby condition should be maintained, at 250, the USB PD controller sends a signal to the primary-side controller to stop regulating, and to stop providing power to the output. The USB PD controller only maintains circuit blocks needed to monitor the output status and turns off unused circuit blocks in the USB PD controller to reduce power consumption. At this time, the power in the system is provided by the charges remaining on the capacitors in the system. At 260, the USB PD controller continues to check the standby condition.

Figure 3:
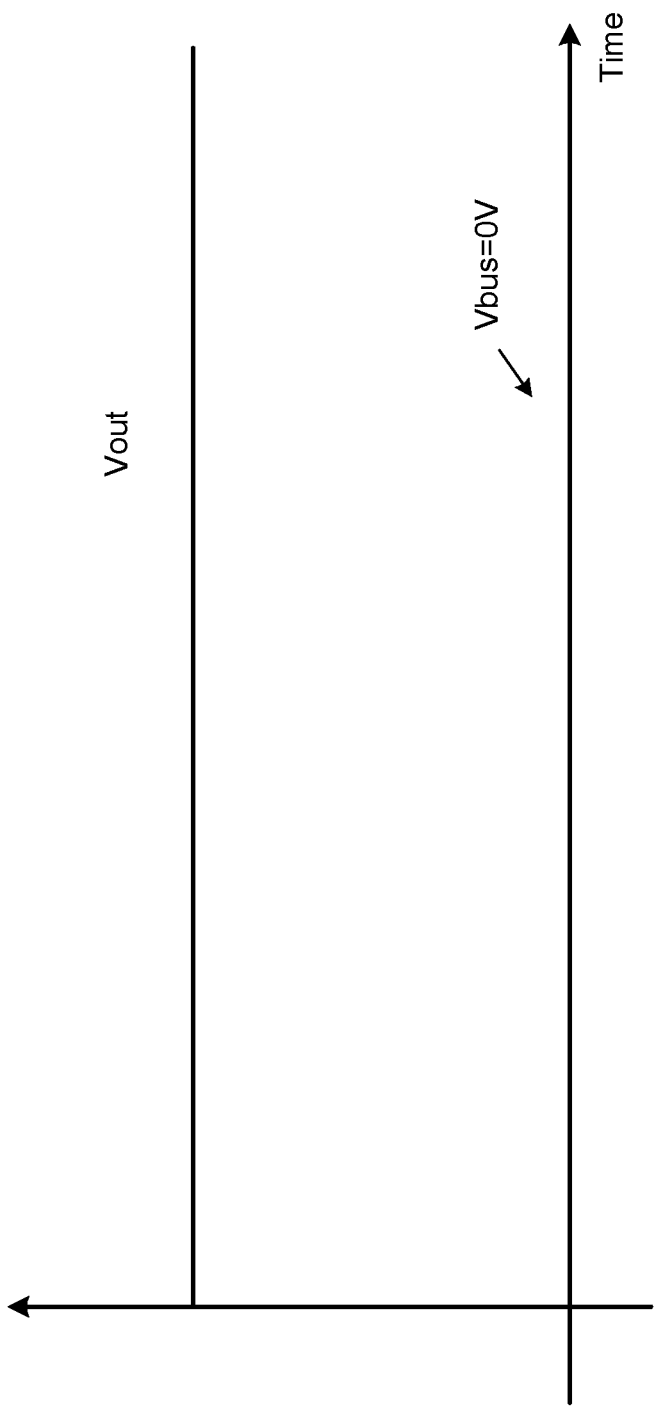
FIG. 3 is a plot illustrating voltages for Vout and Vbus vs. the time axis in a standby condition in a conventional system.

FIG. 3 is a plot illustrating voltages for Vout and Vbus vs. the time axis in a standby condition in a conventional system. It can be seen that, in the standby mode, the load switch is turned off, and the voltage provided to the USB connector is 0 V. However, the output of the power supply is still maintained at Vout. Further, the USB PD controller is still fully functional and continue to consume power.

Figure 4:
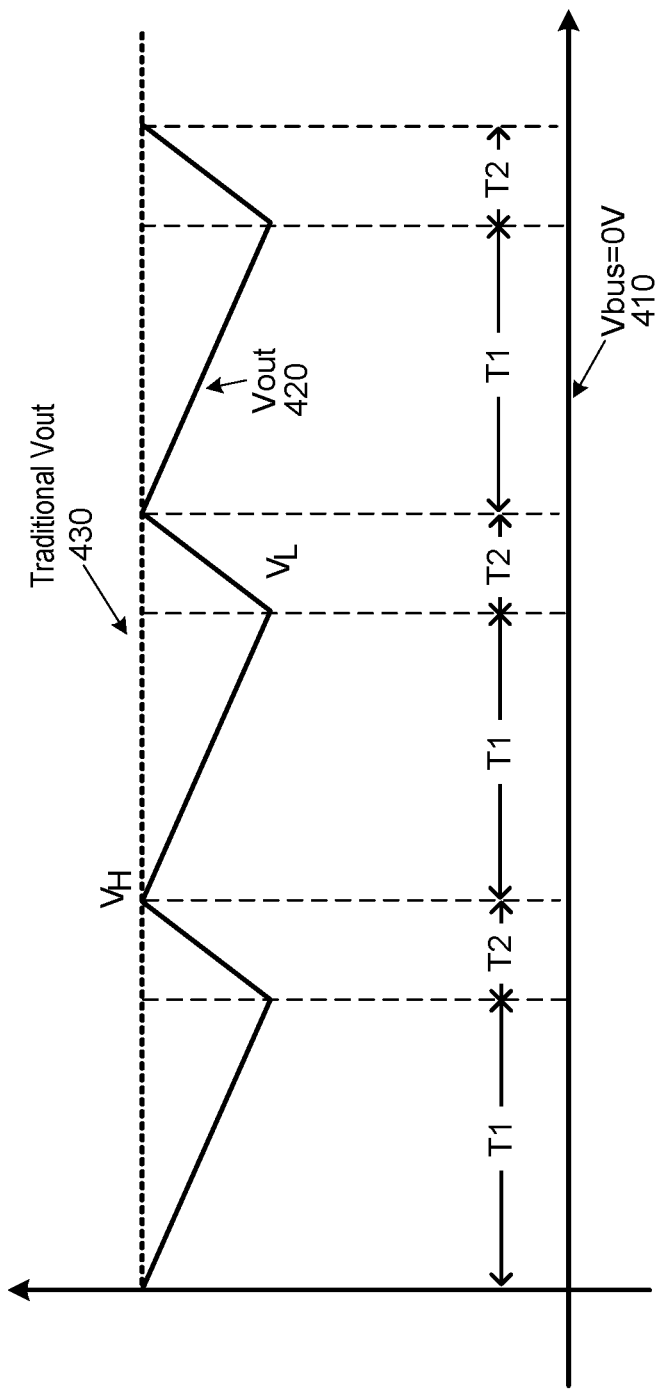
FIG. 4 is a plot illustrating waveforms for Vout and Vbus vs. the time axis in a standby condition that embodies certain aspects of this invention.

FIG. 4 is a plot illustrating waveforms for Vout and Vbus vs. the time axis in a standby condition that embodies certain aspects of this invention. As shown in FIG. 4, if no load device is connected, the load switch 140 is turned off, and Vbus 410 is equal to 0 V. Further, the USB PD controller causes the primary-side controller to stop regulating the output voltage. The USB PD controller also is set in a standby mode, in which the power supply to all functional blocks in the USB PD controller are turned off except for the circuitry needed to continue to monitor the status of the load device and a circuitry to monitor the output voltage of the converter. For example, this can be achieved by setting the feedback voltage (VFB) to a pre-set low value, as described in detail in connection with FIGS. 5-8. Under this condition, the output voltage Vout 420 starts to drop, as shown in FIG. 4. During this time, the active circuit blocks can receive operating power from charges stored in the capacitances in the system. Once the power supply output voltage Vout drops to a pre-set low voltage limit $V_L$, the USB PD controller causes the primary-side controller to start to regulate, for example, by raising the VFB signal, which cause the converter output voltage Vout to rise. When Vout rises to reach the pre-set high voltage limit $V_H$, and no USB device is connected, the USB PD controller again causes the primary-side controller to stop regulating. The low standby voltage limit $V_L$ can be a pre-set minimum working voltage for the USB PD controller, which is sufficient to keep remaining circuit blocks operating. As an example, a target converter output voltage Vout may be 5V, the pre-set high voltage limit $V_H$ can be 5V, and the pre-set low voltage limit $V_L$ can be 3V.

As shown in FIG. 4, Vout 420 exhibits a saw tooth shape, with a first time period T1 of dropping voltage and a second time period T2 of recovery to $V_H$. During the first time period T1, the operating power of the system is provided by the charges stored in the capacitance in the system. The USB PD controller turns off the unused circuit blocks to reduce power consumption during the second time period T1, sustaining the remaining active circuit blocks without the power supply regulating function to provide power. During time period T1, the system is in a power saving mode. During time period T2, the system is in a regulating mode. Thus, during the standby mode can be described as having alternating time periods of power saving mode and regulating mode. The saw tooth shaped cycle in FIG. 4 repeats, until the USB PD controller senses that a USB device is connected. Therefore, a longer time period T1 can lead to reduced power consumption. For example, depending on the circuit implementation and application, T1 can be in the range of between 1-5 seconds or longer, and T2 can be in the range of 40-400 micro seconds, or shorter. FIG. 4 also shows the Vout 430 during standby in a conventional system. Compared with the conventional system, the method described in FIGS. 1-4 can lead to substantially lower standby power. For example, the specification for standby power for different switch mode power supplies can vary from, e.g., 15 mW to 75 mW. Using the techniques described herein, the standby power saving between the systems illustrated by Vout 420 and Vout 430 in FIG. 4 can be 10%-30% or higher.

When the power supply is in the standby mode, the saw tooth shaped cycle in FIG. 4 repeats, until the USB PD controller senses that a USB device is connected. At this time, the USB PD controller wakes up the primary-side controller to resume normal regulating function. Further, the USB PD controller exits the standby mode and restores power to all its functional blocks. Further details are described below in connection with FIGS. 5-8.

According to certain aspects of this invention, a method is presented that can reduce the power consumption under standby conditions. In FIGS. 1-4, USB PD and Type C devices are illustrated as an example. However, it is understood that the method can apply to any load device and power supply. Further, the PDIC circuit is merely an example of a power management device disposed between the power supply and the load device. Moreover, the load switch is a power switch that can be a stand-alone device or, alternatively, the load switch can be integrated in the power management device, such as a PD. In other words, the PDIC and load switch can be two separate IC chips or built in a single chip. In other examples, the power management device (e.g., PDIC in FIG. 1) and the power switch (e.g., load switch in FIG. 1) can be integrated into the power supply.

In the method described above, the power management device, such as the PDIC, can include various functional blocks for implementing power management functions. In the normal operation mode, the power management device is fully operational, with many or all functional blocks powered on. In the power-saving mode, only the functions blocks needed for monitoring the status signal from the load device and the circuitry needed to control the load switcher are powered on. All other blocks can be powered off.

In other examples, it may be desirable to activate other functions in the power management device. In power-saving mode, the functional blocks in the power management device can be selectively powered off according to specific applications.

Figure 5:
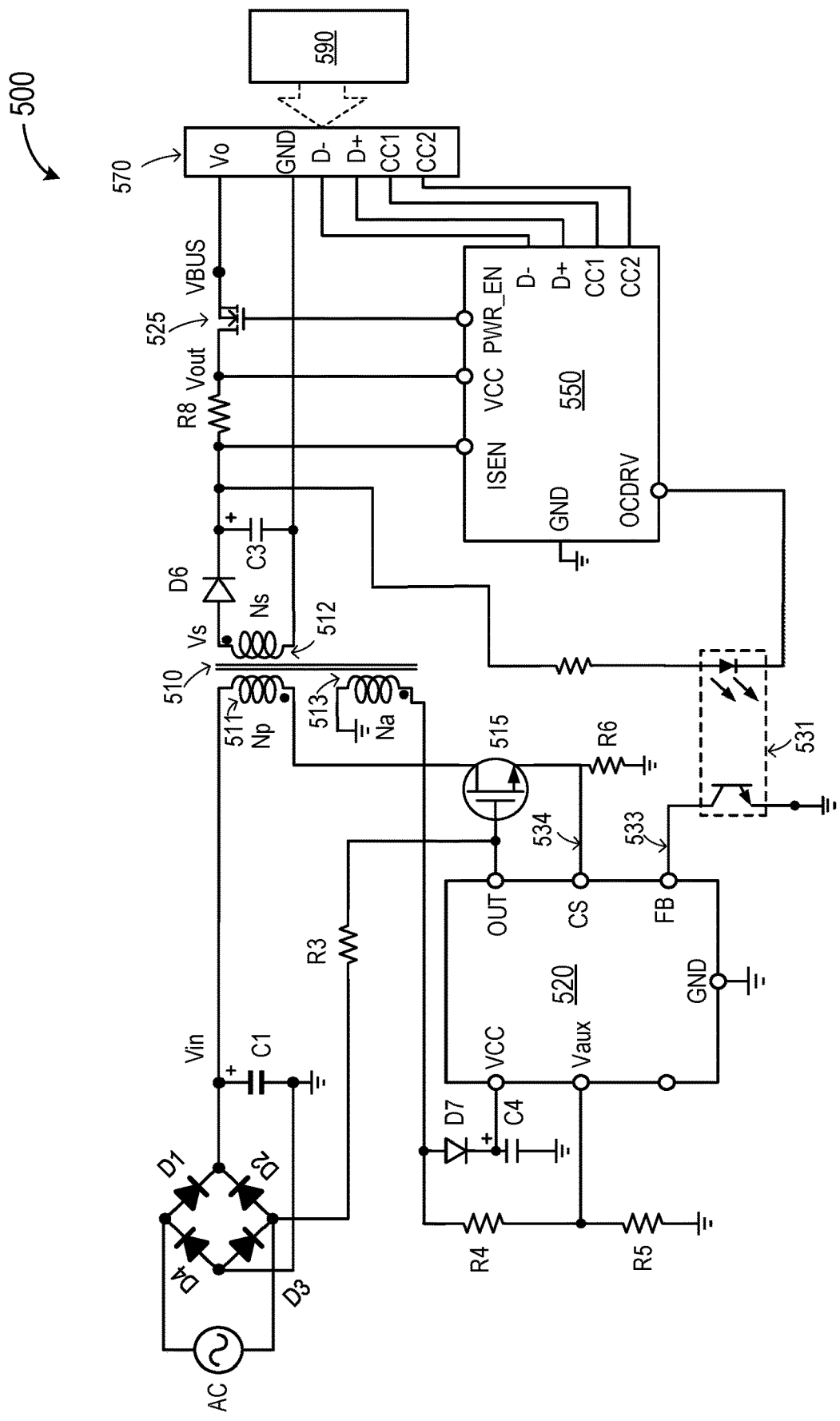
FIG. 5 is a simplified schematic diagram illustrating a system with a power supply providing power to a USB PD device that embodies certain aspects of this invention.

FIG. 5 is a simplified schematic diagram illustrating a system with a power supply providing power to a USB PD device that embodies certain aspects of this invention. As shown in FIG. 5, SMPS 500 is a switch mode power supply with a Universal Serial Bus Power Delivery (USB PD) controller 550. SMPS 500 includes a transformer 510 that has a primary winding 511 coupled in series to a power transistor 515, a secondary winding 512, and an auxiliary winding 513. The primary winding 511 is for coupling to an alternating power source AC through a rectifying circuit that includes, as an example, a diode bridge formed by four diodes D1-D4 and a capacitor C1. The rectifying circuit provides rectified DC voltage Vin to the SMPS. The secondary winding 512 is configured for providing an output voltage Vout of the SMPS to a load device.

Power switch 515, also referred to as power transistor, is coupled to primary winding 511 for controlling the current flow in the primary winding. A primary-side controller 520 receives a feedback signal 533 through a feedback input terminal FB and a current sense signal 534 through a CS input terminal. Primary-side controller 520 is configured to turn on and turn off power switch 515 to regulate the SMPS. When power switch 515 is turned on, a primary current Ip builds in primary winding 511, which stores energy. The energy stored in primary winding 511 is transferred to secondary winding 512 during a turn-off time interval of power switch 515. A rectifier element connected to secondary winding 512, such as diode D6 and a smoothing capacitor C3, is configured to convert a secondary voltage Vs into a DC voltage Vout to supply to a load device.

In the example of FIG. 5, the load device is a USB device. SMPS 500 has a load switch 525 coupling the secondary winding 512 to a USB connector 570, which can be connected to a USB device 590. The USB connector 570 includes several pins, some of which are listed below:

Vo—for receiving the voltage supply Vsub from SMPS 500;
GND—for providing an electrical ground for the load device;
D− and D+—serial data interface pins; and
CC1 and CC2—configuration channels for detecting the signal orientation and channel configuration.

The primary-side controller 520 is configured for generating a control signal for turning on and off the power switch based at least on the feedback signal to regulate the output voltage of the SMPS at a target voltage. For example, the primary-side controller can operate in a pulse-width modulation (PWM) mode during normal operation. The primary-side controller can operate in a burst mode during low-load or no-load conditions. In the burst mode, one or more bursts of turn-on pulses are issued at relatively long intervals to maintain the output voltage of the power supply at a target voltage.

As shown in FIG. 5, USB PD controller 550 is coupled to the secondary winding 512 for providing support for USB Power Delivery operations. The USB PD controller 550 monitors CC1 and CC2 signals from the USB connector 570 to determine if a USB load device is connected to the SMPS, and other connection information. Upon determining that no USB load device is connected to the USB connector, USB PD controller 550 causes the SMPS 500 to enter a standby mode. Upon determining that a USB load device is connected to the USB connector, USB PD controller 550 causes the SMPS to enter an active mode.

As an example, to cause the SMPS 500 to enter the standby mode, USB PD controller 550 turns off load switch 525 to disconnect the output voltage Vout of the SMPS from the USB connector 570 and turns off one or more functional blocks in the USB PD controller 550. As described above in connection with FIGS. 1-4, the USB PD controller 550 causes primary-side controller to stop regulating, and monitors the output voltage Vout of the SMPS 500, and maintains the output voltage Vout within a range just enough to sustain necessary functions to support the standby mode in order to reduce power consumption, as illustrated in FIG. 4. For example, upon determining that the output voltage Vout is above a high standby voltage limit VH, USB PD controller 550 sets the feedback signal 533 to a first value to the feedback terminal of primary-side controller 520 to cause the primary-side controller 520 to stop regulating the output voltage Vout, and allow the output voltage Vout to drop. In the example of FIG. 5, USB PD controller 550 sends the feedback signal 533 through an opto-coupler 531. Upon determining that the output voltage Vout is below a low standby voltage limit VL, USB PD controller 550 sets the feedback signal 533 to a second value to the primary-side controller 520, through the opto-coupler 531, to cause the primary-side controller 520 to start regulating the output voltage Vout, and allow the output voltage to rise. This cycle repeats until a USB load device is connected, and USB PD controller 550 sets the SMPS 500 to the active mode.

To cause the SMPS 500 to enter the active mode, USB PD controller 550 sets the feedback signal to a third value to the primary-side controller 550, through the opto-coupler 531 to cause the primary-side controller to start regulating the output voltage in the active mode. For example, in the active mode, the primary-side controller 550 can operate in pulse width modulation (PWM) mode. SB PD controller 550 also turns on the one or more functional blocks in the USB PD controller 550 to allow it to fully function. Further, USB PD controller 550 also turns on the load switch 525 to connect the output voltage Vout of the SMPS to the USB connector 570.

Figure 6:
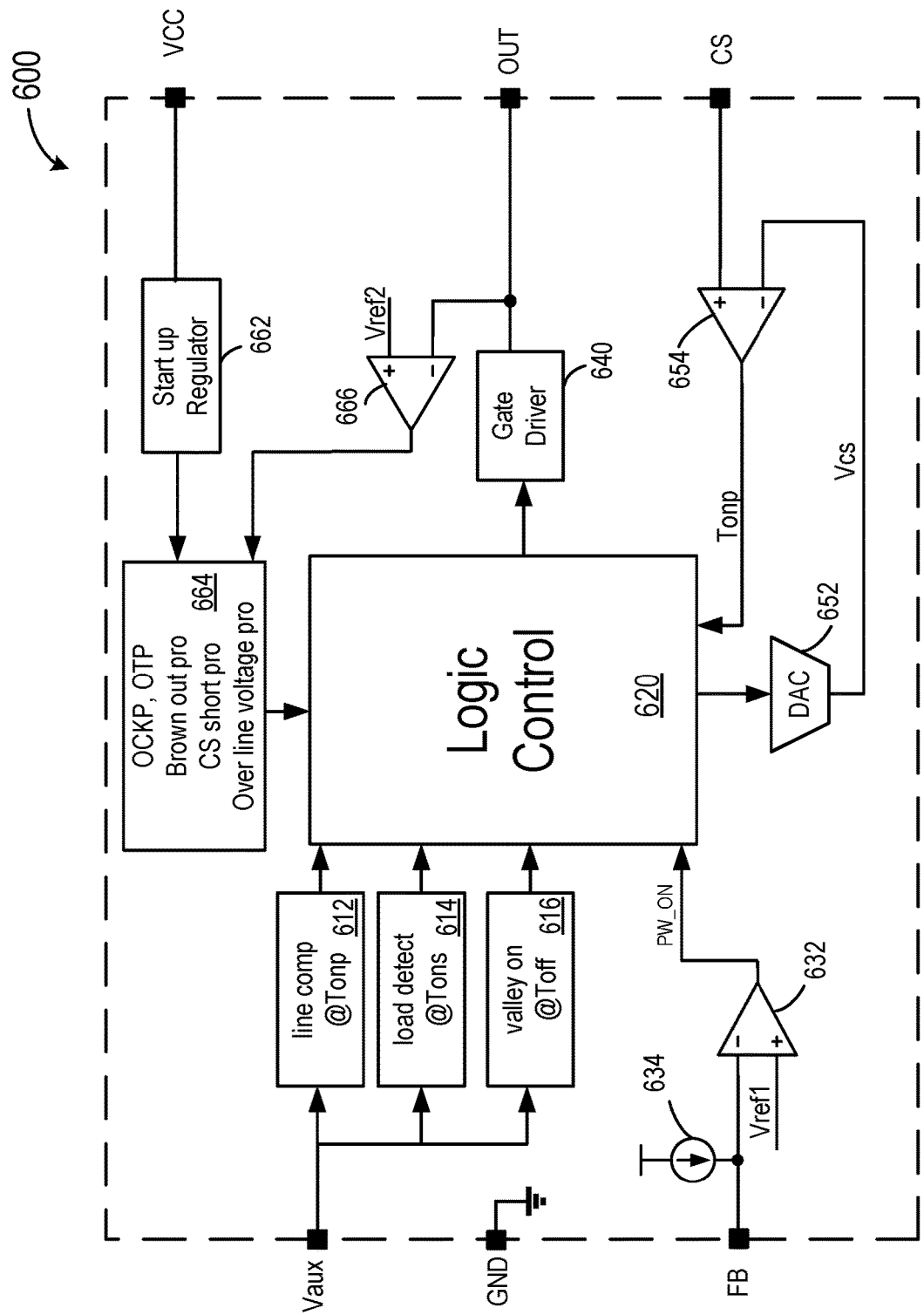
FIG. 6 is a simplified block diagram of a primary-side controller for a switch mode power supply that embodies certain aspects of this invention.

FIG. 6 is a simplified block diagram of a primary-side controller for a switch mode power supply that embodies certain aspects of this invention. As shown in FIG. 6, controller 600 is an example of a controller that can be used as primary-side controller 520 for SMPS 500 in FIG. 5. As shown in FIG. 6, controller 600 has terminals VCC, GND, Vaus, FB, CS, SRC, and OUT, etc. Controller 600 receives operating power through the input terminal VCC, and the GND terminal provides an electrical ground for the controller. At the Vaux terminal, controller 600 senses a voltage related to a current of the auxiliary winding, which represents a state of the SMPS output. Several circuit blocks receive the signal from the Vaux terminal and performs various functions. For example, circuit block 612 is configured for line compensation, circuit block 614 is configured for load detect, and circuit block 616 is configured for detecting valley on function. The outputs from these control blocks are coupled to logic control block 620, which performs various functions as described below. Block 662 is a start up regulator, and Block 664 includes various protection circuits an support circuits.

In the example of FIG. 6, logic control block 620 can issue a control signal to gate driver block 640 to turn on the power switch in response to the turn-on signal from the secondary-side, and to turn off the power switch when the primary current reaches a peak current reference level, which is also referred to as the primary current reference level or peak primary current level. As shown in FIG. 6, the turn-on signal from the secondary-side is received at the FB terminal, which is coupled to a current source 634 and an input of a comparator 632. The other input of comparator 632 is coupled to a reference signal Vref1. Comparator 632 provides a PW_ON signal to logic control block 620, which is coupled to gate drive block to provide a control signal at the OUT terminal for turning on the power switch.

The other terminal of comparator 654 receives a voltage signal Vcs, which is related to a limit of the peak primary current. In the example of FIG. 6, logic control block 620 provides the Vcs signal through a digital-to-analog converter (DAC) 652. When the current sense signal at terminal CS reaches the peak current reference signal Vcs, comparator 654 sends a signal Tonp to logic control block 620, which, through gate driver 640, sends a control signal at the OUT terminal to turn off the power switch.

In some examples, logic control block 620 can provide pulse width modulation (PWM) signals to control the power switch to regulate the power supply in normal mode operation. In low load or no load conditions, logic control block 620 can operate in a burst mode, in which bursts of turn-on pulses are issue at relatively long intervals to maintain the output voltage of the power supply at a target voltage. Further, in standby mode or power saving mode, logic control block 620 can be stopped from regulating the power supply, and allow the secondary-side controller to monitor the output voltage. In this case, the secondary-side controller can issue a wake up signal to cause the primary-side controller to resume the regulation function. For example, the standby mode can be triggered by the primary-side controller receiving a signal at the FB terminal that is lower than the Vref1 reference voltage. The wake up signal can be a signal at the FB terminal that is higher than the Vref1 reference voltage. In the example of FIG. 5, the FB terminal receives the feedback signal through opto-coupler 531. If the feedback signal is below, e.g., 0.6 V, the primary-side controller stops regulating the power switch.

Figure 7:
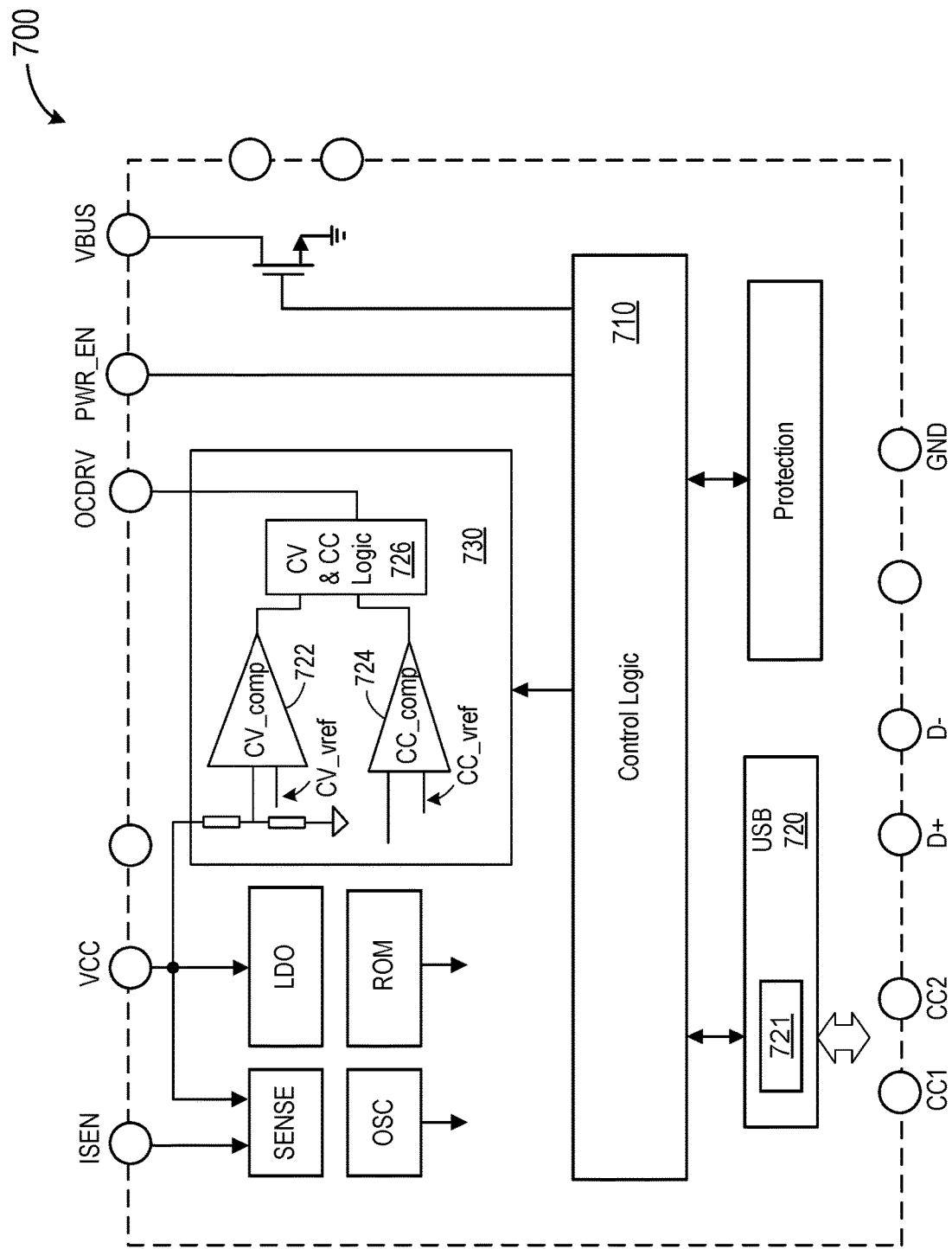
FIG. 7 is a simplified block diagram of a secondary-side controller for a switch mode power supply that embodies certain aspects of this invention.

FIG. 7 is a simplified block diagram of a secondary-side controller for a switch mode power supply that embodies certain aspects of this invention. As shown in FIG. 7, secondary-side controller 700 in FIG. 7 is an example of controllers that can be used as USB PD controller 550 in SMPS 500 in FIG. 5, and the components in FIG. 5 are referenced in the description below. Controller 700 includes a first terminal VCC for coupling to a secondary winding 512 of SMPS 500 for providing an output voltage Vout to USB connector 570, a second terminal PWR_EN providing a control signal to load switch 525 coupled between the secondary winding and the USB connector, and a third terminal OCDRV for driving opto-coupler 531 to provide a feedback signal 533 to a primary-side controller of the SMPS. Secondary-side controller 700 also includes terminals D+, D−, CC1, and CC2 for receiving corresponding signals from the USB connector 570. Secondary-side controller 700 also includes additional terminals. For example, the GND terminal provides an electrical ground, the ISEN terminal is used to sense a current in the secondary winding, and the VBUS terminal is connected to voltage VBUS provided to the USB connector 570, etc.

Secondary-side controller 700 includes several function blocks. For example, control logic 710 works with other functional blocks to implement the functions of secondary-side controller 700. The USB block 720 receives signals from USB connector 570 and is in charge of Power Delivery protocol for communication between adapter and device. For example, USB block 720 can include a decoder 721 for monitoring CC1 and CC2 signals from the USB connector to determine if a USB device is connected. The OSC block provides oscillators for the controller. The LDO (low dropout) circuit provides regulated voltages for the controller and the connector. The ROM block provides read only memory. The SENSE block performs output current sense and feedback for over current protection and current control. Block 730 provides constant voltage (CV) and constant current (CC) control, as described further below.

Secondary-side controller 700 is coupled to the secondary winding for providing constant voltage (CV) and constant current (CC) control of the SMPS. Secondary-side controller 700 can receive an output selection signal. For example, the output selection signal can be received at the D+ and D− terminals. Based on the output selection signal, secondary-side controller 700 can select a target voltage reference signal and/or to select a target current reference signal. Secondary-side controller 700 can monitor an output voltage and an output current of the SMPS to determine if the output voltage is below the target voltage reference signal, and if the output current is below the target current reference signal. Secondary-side controller 700 can provide a turn-on signal to the primary-side controller for turning on the power switch upon determining that the output voltage is below the selected voltage reference signal and the output current is below the selected current reference signal. The primary-side controller can turn on the power switch in response to the turn-on signal from the secondary-side. In some embodiments, the primary-side controller can turn off the power switch when the primary current reaches a peak primary current reference level.

In FIG. 7, the selected voltage reference signal CV_vref is coupled to a comparator CV_comp (722), and the selected current reference signal CC_vref is coupled to another comparator CC_comp (724). Controller 700 also monitors the output voltage and the output current of the SMPS. The VCC terminal provides information about the output of the SMPS, and the ISEN terminal is configured to provide information about the current in the secondary winding. Based on information provided by comparators 722 and 724, the CV & CC logic circuit 726 in controller 700 determines if the output voltage is below the selected voltage reference signal, and if the output current is below the selected current reference signal. Control circuit 700 further provides a turn-on signal to the primary-side controller for turning on the power switch upon determining that the output voltage is below the selected voltage reference signal and the output current is below the selected current reference signal. In this example, the turn-on signal is coupled to terminal OCDRV, which is coupled to the opto-coupler for providing the signal to primary-side controller. In other embodiments, the communication between primary-side controller and secondary-side controller can be achieved by a different means, for example, through inductive coupling through a transformer.

The control logic 710 provides control over the power saving functions described above. For example, control logic 710 monitors CC1 and CC2 signals from the USB connector to determine if a USB load device is connected. Upon determining that no USB load device is connected to the USB connector, control logic 710 causes the SMPS to enter a standby mode. Upon determining that a USB load device is connected to the USB connector, control logic 710 causes the SMPS to enter an active mode. In the standby mode, the control logic 710 turns off the load switch to disconnect the output voltage of the SMPS from the USB connector, and turn off one or more functional blocks in the USB PD controller to reduce power consumption. For example, in the standby mode, block 730 can be turned off, along with the Protection block, the SENSE block, the switch coupled to the VBUS terminal, and part of the USB block 720 that handles PD prototype functions, etc.

Control logic 710 also monitors the output voltage of the SMPS and performs the following functions. Upon determining that the output voltage is above a high standby voltage limit, control logic 710 sends a first feedback signal to the primary-side controller, through the opto-coupler, to cause the primary-side controller to stop regulating the output voltage, and allow the output voltage to drop. Upon determining that the output voltage is below a low standby voltage limit, control logic 710 sends a second feedback signal to the primary-side controller, through the opto-coupler, to cause the primary-side controller to start regulating the output voltage, and allow the output voltage to rise.

To enter the active mode, control logic 710 sends a third feedback signal to the primary-side controller 550, through the opto-coupler 531 to cause the primary-side controller to start regulating the output voltage in the active mode. Control logic 710 also turns on the one or more functional blocks in the USB PD controller 550 to allow it to fully function. Further, control logic 710 also turns on the load switch 525 to connect the output voltage Vout of the SMPS to the USB connector 570.

FIG. 7 is an example of a secondary-side controller that can be used as a universal serial bus power delivery (USB PD) controller, which has a first terminal for coupling to a secondary winding of a switch mode power supply (SMPS) for receiving operating power, a second terminal providing a control signal to a load switch coupled between the secondary winding and an USB connector, and a third terminal for providing a feedback signal to a primary-side controller of the SMPS. The USB PD controller also has a decoder for monitoring CC1 and CC2 signals from the USB connector to determine if a USB device is connected. A control logic in the USB PD controller is configured to monitor CC1 and CC2 signals from the USB connector to determine if a USB load device is connected. Upon determining that no USB load device is connected to the USB connector, the control logic turns off the load switch to disconnect the secondary winding from the USB connector, and enters a standby mode. The standby mode includes alternating first time period of power-saving mode and second time period of regulating mode. In the power-saving mode, the control logic stops regulating the output of the power supply and turns off one or more functional blocks to allow the output to drop, until the output reaches to a pre-set low output limit. In the regulating mode, the control logic turns on the functional blocks and regulates the power supply to allow the output to increase, until the output reaches a pre-set high output limit. Upon determining that a USB load device is connected to the USB connector, the control logic enter a normal mode, in which the control logic regulates the output of the power supply, the functional blocks are powered on, and the load switch is turned on to connect the load device to the power supply.

Figure 8:
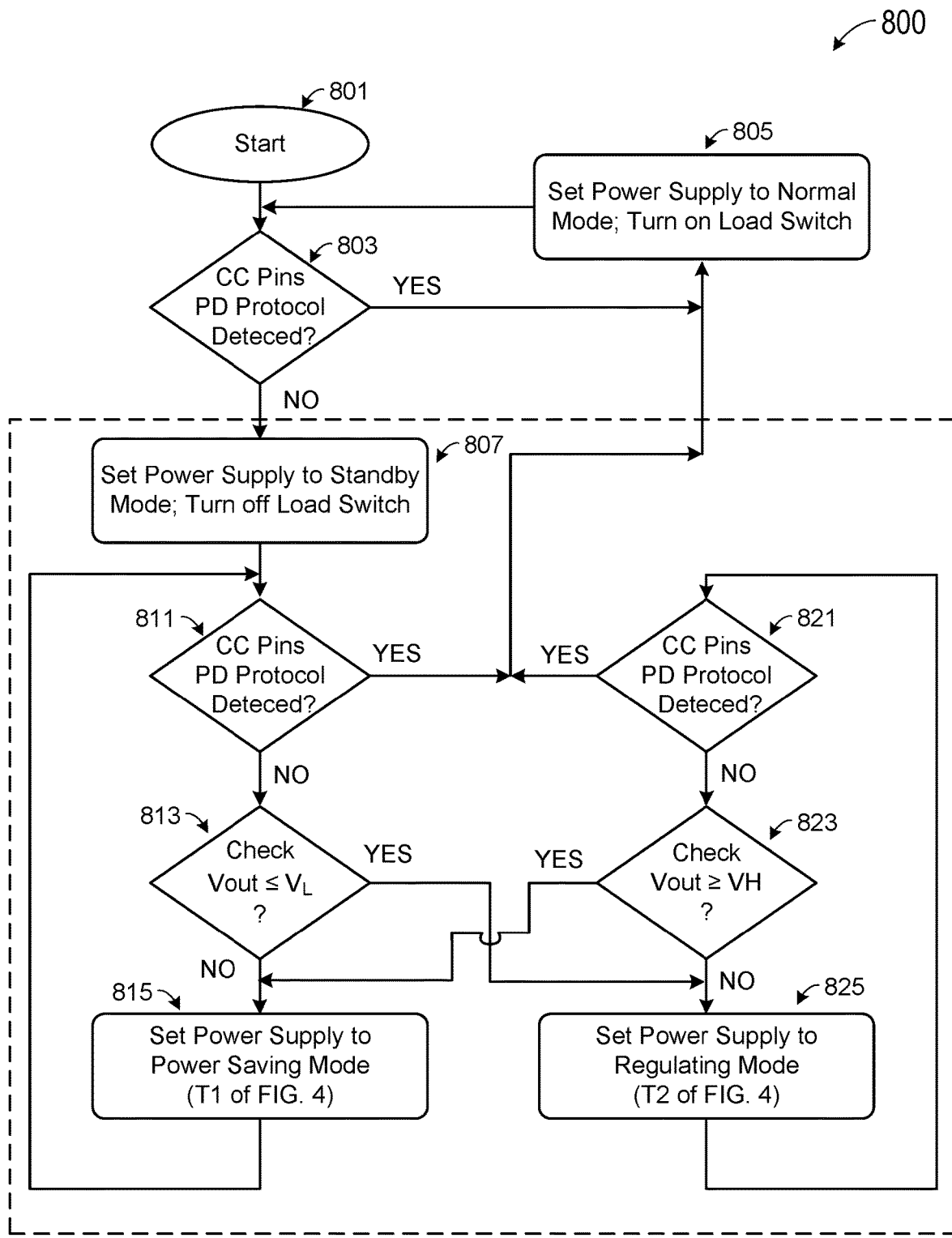
FIG. 8 is a simplified flowchart illustrating a method for reducing standby power in a power supply that embodies certain aspects of this invention.

FIG. 8 is a simplified flowchart illustrating a method for reducing standby power in a power supply, that embodies certain aspects of this invention. In an example, the power supply has a control circuit for regulating an output of the power supply and a load switch for connecting the output of the power supply to a load device. The method includes determining if a load device is connected to the power supply. In response to determining that no load device is connected to the power supply, the method includes turning off the load switch to disconnect from the load device and entering a standby mode. The standby mode includes alternating first time period of power-saving mode and second time period of regulating mode. In the power-saving mode, the control circuit stops regulating the output of the power supply and turns off one or more functional blocks to allow the output to drop, until the output reaches to a pre-set low output limit. In the regulating mode, the control circuit turns on the functional blocks and regulates the power supply to allow the output to increase, until the output reaches a pre-set high output limit. On the other hand, in response to determining that a load device is connected to the power supply, the method includes entering a normal mode, in which the control circuit regulates the output of the power supply, the functional blocks in the control circuit are powered on, and the load switch is turned on to connect the load device to the power supply. An example is further illustrated in the flowchart in FIG. 8.

As shown in FIG. 8, the method 800 starts a 801, and includes, at 803, determining if a load device is connected to an output of power supply. For the USB PD examples described above, process 803 can include checking the CC pins to determine if a USB PD protocol is detected to determine if a USB device is connected. However, other connections and protocols can also be used. If a load device is connected, at 805, the power supply is set to normal mode, the power supply is regulated to provide a desired output and the load switch is turned on to connect the load device. Upon determining that no load device is connected, at 807 the method sets the power supply a standby mode.

The standby mode is shown in the dashed box in FIG. 8, the load switch is turned off, and includes alternating first time period of power-saving mode and second time period of regulating mode. In the example illustrated in FIG. 4, the power-saving mode is the first time period T1 and the regulating mode is the second time period T2. In the power-saving mode, the control circuit stops regulating the output of the power supply and turns off one or more functional blocks to allow the output to drop, until the output reaches to a pre-set low output limit. In the regulating mode, the control circuit turns on the functional blocks and regulates the power supply to allow the output to increase, until the output reaches a pre-set high output limit.

At 811, similar to 803, the method checks if a load device is connected. If so, the power supply enters the normal mode at 805. If no device is connected, at 813, the output of the power supply, voltage or current, is checked to see if a pre-set low output limit is reached. If not, at 815, the regulation of the power supply is stopped, unused functional blocks are turned off, and the output is allowed to drop. The method then loops to 811.

At 813, if the output drops below a pre-set low output limit, the method proceeds to 825, where the power supply is set to regulation mode and the output is regulated, and the output is allowed to rise.

From 825, the method proceeds to 821, where, again, the connection of a load device is checked. If a load device is connected, the method proceeds to 805 to enter the normal mode. If no load device is connected, at 823, the output of the power supply is compared with a pre-set high output limit.

At 823, if the pre-set high output limit is reached, the method proceeds to 815 to enter the power-saving mode to keep the output within the range between the pre-set low output limit and the pre-set high output. If the output has not reached the pre-set high output limit, then the power supply stays in the regulating mode.

In the examples of FIGS. 1-7, in the power-saving mode, the secondary-side controller turns off the load switch and turns off unused function blocks. The method 800 can also include the secondary-side controller sending a first feedback signal to the primary controller, and in response, the primary-side controller stopping regulating the power supply. The method 800 can also include the secondary-side controller sending a second feedback signal to the primary controller, and in response, the primary-side controller stopping regulating the power supply and, further, turning off one or more functional blocks in the primary controller to further reduce power consumption. The method 800 can also include the secondary-side controller sending a third feedback signal to the primary controller, and in response, the primary-side controller turns on the functional blocks and starts regulating the power supply.

Examples of method 800 is described above with reference to FIGS. 1-7 in the context of an SMPS with a secondary-side controller functioning as a USB PD controller. The method can also include the secondary-side controller sending a first feedback signal to the primary controller, and in response, the primary-side controller stopping regulating the power supply. Alternatively, the method can also include the secondary-side controller sending a second feedback signal to the primary controller, and in response, the primary-side controller stopping regulating the power supply and turning off one or more functional blocks in the primary controller to further reduce power consumption. Further, the method can include the secondary-side controller sending a third feedback signal to the primary controller, and in response, the primary-side controller turning one or more functional blocks and regulating the power supply.

It is understood that the examples and embodiments described herein are for illustrative purposes only and that various modifications or changes in light thereof will be suggested to persons skilled in the art and are to be included within the spirit and purview of this application and scope of the invention. For instance, in the examples described above, the output voltage is referred to as a control parameter. However, the power supply also includes current regulation functions, and the output of the power supply can also refer to the output current, or to both the output voltage and the output current. Further, the power supply is not limited to a switch mode power supply. Even though a pulse width modulation (PWM) controller is used in the above description, a pulse frequency modulation (PFM) controller can also be used. Moreover, the method can also be implemented in other power supplies or converters without substantial modification. For example, the method illustrated in FIG. 8 can also be applied to isolated and non-isolated converters, and linear regulators, etc.

What is claimed is:

1. A Universal Serial Bus Power Delivery (USB PD) controller, comprising:
 a first terminal (VCC) for coupling to a secondary winding of a switch mode power supply (SMPS) for receiving an output voltage of the SMPS for operating power;
 a second terminal (PWR_EN) providing a control signal to a load switch coupled between the secondary winding and a USB connector;
 a third terminal (OCDRV) for providing a feedback signal to a primary-side controller of the SMPS;
 a decoder for monitoring CC1 and CC2 signals from the USB connector to determine if a USB device is connected;
 a constant voltage and constant current control circuit block including a constant voltage circuit with a first input coupled to the first terminal for receiving the output voltage and a second input coupled to a voltage reference signal for comparing the output voltage of the SMPS with a voltage reference signal, the control circuit block providing the feedback signal to the primary-side controller; and
 a control logic;
 wherein the USB PD controller is configured to:
 monitor CC1 and CC2 signals from the USB connector to determine if a USB load device is connected;
 upon determining that no USB load device is connected to the USB connector, turn off the load switch to disconnect the secondary winding from the USB connector, and enter a standby mode;
 wherein the standby mode includes alternating first time period of power-saving mode and second time period of regulating mode;
 in the power-saving mode, the USB PD controller stops regulating the output of the power supply and turns off one or more functional blocks to allow the output to drop, until the output reaches a pre-set low output limit, at which time the control circuit block sets the feedback signal at a first value to cause the primary-side controller to enter the regulating mode to allow the output to increase; and
 in the regulating mode, the USB PD controller turns on the functional blocks and regulates the power supply to allow the output to increase, until the output reaches a pre-set high output limit, at which time the control circuit block sets the feedback signal at a second value to cause the primary-side controller to enter the power saving mode and stop regulating;

upon determining that a USB load device is connected to the USB connector, enter a normal mode, wherein the USB PD controller:

sets the voltage reference signal in the control circuit block of the USB PD controller at a target voltage reference signal and sends the feedback signal to the primary-side controller, to cause the primary-side controller to start regulating the output voltage under the control the USB PD controller; and turns on the load switch to connect the output voltage of the SMPS to the load device.

2. The Universal Serial Bus Power Delivery (USB PD) controller of claim 1, wherein the USB PD controller is configured to send a feedback signal to the primary controller through an opto-coupler.

3. A switch mode power supply (SMPS) with a Universal Serial Bus Power Delivery (USB PD) controller, comprising:

a transformer having a primary winding for coupling to an external input voltage and a secondary winding for providing an output voltage of the SMPS;

a load switch coupling the secondary winding to a USB connector;

a power switch for coupling to the primary winding of the SMPS;

a primary-side controller coupled to the power switch to control the power switch, the primary-side controller including a feedback terminal (FB) for receiving a feedback signal representative of the output voltage of the SMPS through an opto-coupler, wherein:

the primary-side controller is configured for generating a control signal for turning on and off the power switch based at least on the feedback signal to regulate the SMPS to allow the output to increase; and the primary-side controller operates in a pulse-width modulation (PWM) mode during normal operation, and the primary-side controller operates in a burst mode during low-load or no-load conditions;

a USB PD controller coupled to the secondary winding for providing support for USB Power Delivery operations, the USB PD controller including:

a first terminal (VCC) for coupling to a secondary winding of a switch mode power supply (SMPS) for receiving an output voltage of the SMPS for operating power;

a second terminal (PWR_EN) providing a control signal to a load switch coupled between the secondary winding and a USB connector;

a third terminal (OCDRV) for providing the feedback signal to a primary-side controller of the SMPS;

a decoder for monitoring CC1 and CC2 signals from the USB connector to determine if a USB device is connected; and a control circuit block (730) including a constant voltage (CV) control circuit for comparing the output voltage of the SMPS with a voltage reference signal, the control circuit block providing the feedback signal to the third terminal; and a control logic;

wherein the USB PD controller is configured to:

monitor CC1 and CC2 signals from the USB connector;

in an active mode, upon determining that no USB load device is connected to the USB connector, cause the SMPS to enter a standby mode; and in the standby mode, upon determining that a USB load device is connected to the USB connector, cause the SMPS to enter an active mode;

wherein, to cause the SMPS to enter the standby mode, the USB PD controller is configured to:

turn off the load switch to disconnect the output voltage of the SMPS from the USB connector;

turn off one or more functional blocks in the USB PD controller;

monitor the output voltage of the SMPS;

upon determining that the output voltage is above a high standby voltage limit, set the feedback signal at a second value below a pre-set voltage value to the primary-side controller, through the opto-coupler, to cause the primary-side controller to stop regulating the output voltage, and allow the output voltage to drop; and upon determining that the output voltage is below a low standby voltage limit, set the feedback signal at a first value to the primary-side controller, through the opto-coupler, to cause the primary-side controller to start regulating the output voltage, and allow the output voltage to rise; and wherein, to cause the SMPS to enter the active mode, the USB PD controller is configured to:

turn on the one or more functional blocks in the USB PD controller;

set the voltage reference signal in the control circuit block of the USB PD controller at a target voltage reference signal and send the feedback signal at the second value to the primary-side controller, through the opto-coupler, to cause the primary-side controller to start regulating the output voltage under the control the USB PD controller; and turn on the load switch to connect the output voltage of the SMPS to the USB connector.

4. The switch mode power supply of claim 3, wherein the load switch is an MOS transistor.

5. A method for reducing standby power in a switch mode power supply (SMPS), which has a transformer including a primary winding and a secondary winding, a power switch coupled to the primary winding, a primary-side controller, a secondary-side controller, and a load switch coupled between the secondary winding and an output connector, wherein the secondary-side controller comprises a control circuit block including a constant voltage circuit for comparing an output voltage of the SMPS with a voltage reference signal, the control circuit block providing an feedback signal to a third terminal, the method comprising:

in the secondary-side controller, determining if a load device is connected to the output connector;

upon determining that a load device is connected to the SMPS, operating the SMPS in a normal mode, wherein the secondary-side controller turns on the load switch and sets the voltage reference signal in the control circuit block of the secondary-side controller at a target voltage reference signal and sends the feedback signal to the primary-side controller, to cause the primary-side controller to start regulating the output voltage under the control of the secondary-side controller;

upon determining that no load device is connected to the SMPS, turning off the load switch and operating the SMPS in a standby mode, which includes alternating first time period of power-saving mode and second time period of regulating mode, wherein:

in the power-saving mode, the secondary-side controller stops regulating the output of the power supply and turns off one or more functional blocks to allow the output to drop, until the output reaches a pre-set low output limit, at which time the control circuit block sets the feedback signal at a first value to cause the primary side to enter the regulating mode to allow the output to increase under the control of the secondary-side controller; and in the regulating mode, the secondary-side controller turns on the functional blocks and regulates the power supply to allow the output to increase, until the output reaches a pre-set high output limit, at which time the control circuit block sets the feedback signal at a second value to cause the primary side to enter the power saving mode and stop regulating.

6. The method of claim 5, wherein the secondary-side controller is a universal serial bus power delivery (USB PD) controller.

7. The method of claim 6, further comprising monitoring CC1 and CC2 signals to determine if a PD protocol is detected and a load device is connected to the SMPS.

8. The method of claim 5, wherein the power supply is a non-isolated power supply.

* * * * *